UNITED STATES PATENT OFFICE.

WILLIAM M. FRASER, OF WOODBRIDGE, NEW JERSEY, ASSIGNOR TO THE BARBER ASPHALT PAVING COMPANY, OF PHILADELPHIA, PENNSYLVANIA, A CORPORATION OF WEST VIRGINIA.

CEMENTITIOUS BITUMINOUS EMULSION.

1,259,223. Specification of Letters Patent. Patented Mar. 12, 1918.

No Drawing. Application filed October 25, 1917. Serial No. 198,510.

*To all whom it may concern:*

Be it known that I, WILLIAM M. FRASER, a citizen of the United States, and a resident of Woodbridge, in the county of Middlesex and State of New Jersey, have invented certain new and useful Improvements in Cementitious Bituminous Emulsions, whereof the following is a specification.

This invention relates to a cementitious bituminous composition consisting of a semi-liquid asphaltic residuum, as for example, the residue of Mexican, Venezuelan or California petroleum, remaining in the still after the naphthas, burning oils, and similar light oils have been removed, emulsified with a watery solution of rosin or rosin oil soap. It is miscible in all proportions with water, and is especially applicable as a binding agent for mixtures of stone, sand or the like, or for providing a water and weather resisting coating upon felts or fabrics. It can be used at any temperature between the freezing point and boiling point of water, and furthermore becomes immiscible with water and weather resisting after its original water of composition once evaporates.

In practising this invention, I take 74.5 gallons of the residuum of say Mexican petroleum, and 43 gallons of watery solution of rosin oil soap. These I combine by running them from their separate receptacles, in the relative amounts stated and passing them together through a single hydraulic pump by which they are discharged into a third tank. After these two substances are brought together, substantially as described, they are further circulated through the pump and are thereby united into a homogeneous mixture or emulsion having the properties hereinafter mentioned.

When a bituminous composition is properly made according to the directions which I have given, there is no separation within thirty days, between the component parts, and when tested with a drop of fresh water it is stained a light brown color at the point of contact. If differently made or otherwise improperly prepared the asphaltic residuum will, in less than thirty days, separate into one layer and the water into another.

Having thus described my invention, I claim:

1. A bituminous emulsion consisting of a semi-liquid asphaltic residuum and a watery solution of rosin or rosin oil soap mixed and emulsified with the production of a composition which is miscible in all proportions with water, which will not separate into its components within thirty days, and which when tested with a drop of fresh water is stained a light brown color at the point of contact.

2. A bituminous emulsion consisting of about 75 gallons of a semi-liquid asphaltic residuum and about 43 gallons of a watery solution of rosin or rosin oil soap pumped together until the two are thoroughly emulsified and miscible in all proportions with water.

In testimony whereof, I have hereunto signed my name, at Philadelphia, Pennsylvania, this twenty-second day of October, 1917.

WILLIAM M. FRASER.

Witnesses:
JAMES H. BELL,
E. L. FULLERTON.